United States Patent
Mellet et al.

(10) Patent No.: US 6,705,617 B2
(45) Date of Patent: Mar. 16, 2004

(54) HYDRODYNAMIC SEAL AND METHOD OF MAKING THE SAME

(75) Inventors: Edward W. Mellet, Royal Oak, MI (US); David M. Toth, Brighton, MI (US); Carole L. Straub, Ida, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/995,939

(22) Filed: Nov. 28, 2001

(65) Prior Publication Data

US 2003/0098549 A1 May 29, 2003

(51) Int. Cl.⁷ .............................. F16J 15/32; B23P 17/00
(52) U.S. Cl. ........................ 277/559; 277/560; 29/417
(58) Field of Search ............................... 277/549, 559, 277/560, 570; 29/417, 527.1, 888.3

(56) References Cited

U.S. PATENT DOCUMENTS

| | | | |
|---|---|---|---|
| 3,857,156 A | | 12/1974 | Clark |
| 3,929,341 A | | 12/1975 | Clark |
| 4,126,320 A | * | 11/1978 | Pendleton ................. 277/568 |
| 4,450,614 A | * | 5/1984 | Repella ..................... 29/417 |
| 4,497,496 A | | 2/1985 | Repella |
| 4,568,092 A | * | 2/1986 | Hayashida et al. ......... 277/559 |
| 4,695,063 A | * | 9/1987 | Schmitt et al. ............. 277/559 |
| 4,723,350 A | * | 2/1988 | Kobayashi et al. .......... 29/417 |
| 4,886,281 A | * | 12/1989 | Ehrmann et al. ........... 277/560 |
| 5,024,364 A | | 6/1991 | Nash |
| 5,209,502 A | * | 5/1993 | Savoia ...................... 277/562 |
| 5,462,287 A | | 10/1995 | Hering et al. |
| 5,692,757 A | * | 12/1997 | Straub ....................... 277/559 |
| 5,860,656 A | | 1/1999 | Obata et al. |
| 6,079,715 A | * | 6/2000 | Johnen et al. .............. 277/565 |
| 6,123,514 A | * | 9/2000 | Kawaguchi et al. ....... 417/222.2 |
| 6,149,158 A | * | 11/2000 | Tripathy .................... 277/307 |
| 6,168,164 B1 | | 1/2001 | Toth et al. |

FOREIGN PATENT DOCUMENTS

| | | |
|---|---|---|
| JP | 4-157264 | 5/1992 |
| JP | 6-129546 | 5/1994 |

* cited by examiner

Primary Examiner—Lloyd A. Gall
Assistant Examiner—Michael J. Kyle
(74) Attorney, Agent, or Firm—Howard & Howard

(57) ABSTRACT

A hydrodynamic shaft seal formed with a spiral hydrodynamic channel in which successive turns of the channel are of progressively diminishing volume toward an air side of the seal. The channel is made by forming a spirally extending first cut in a surface of the seal, and forming a spirally extending second cut in the surface of the seal adjacent to the first cut such that the first and second cuts intersect below the surface of the seal to produce a spiral channel. The spiral of the first cut has a lead different from the lead of the second cut such that the channel is of progressively diminishing volume along its length. Alternatively, the second cut may have the same lead as the first cut for the first few turns, after which the lead of the second cut may be reduced, to provide a channel of constant volume for the first few turns, followed by a channel portion of reduced volume.

16 Claims, 2 Drawing Sheets

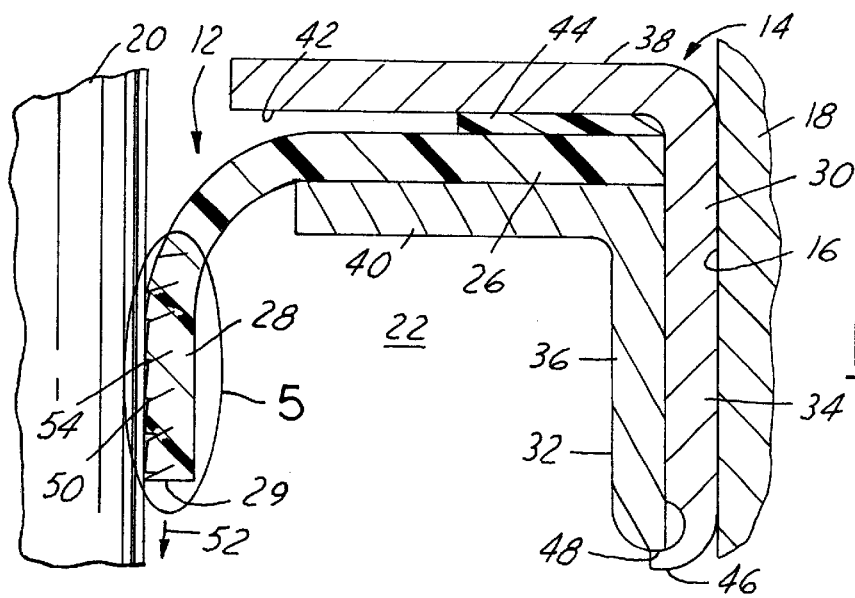
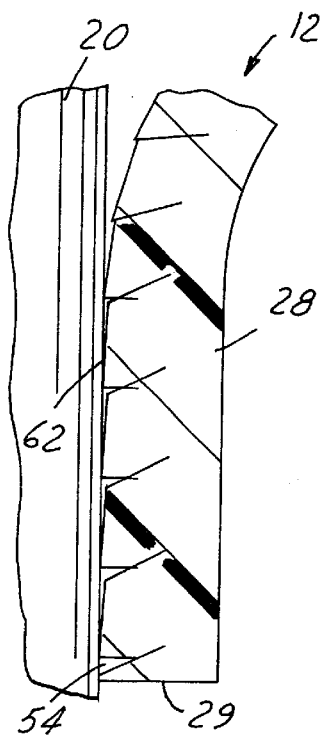
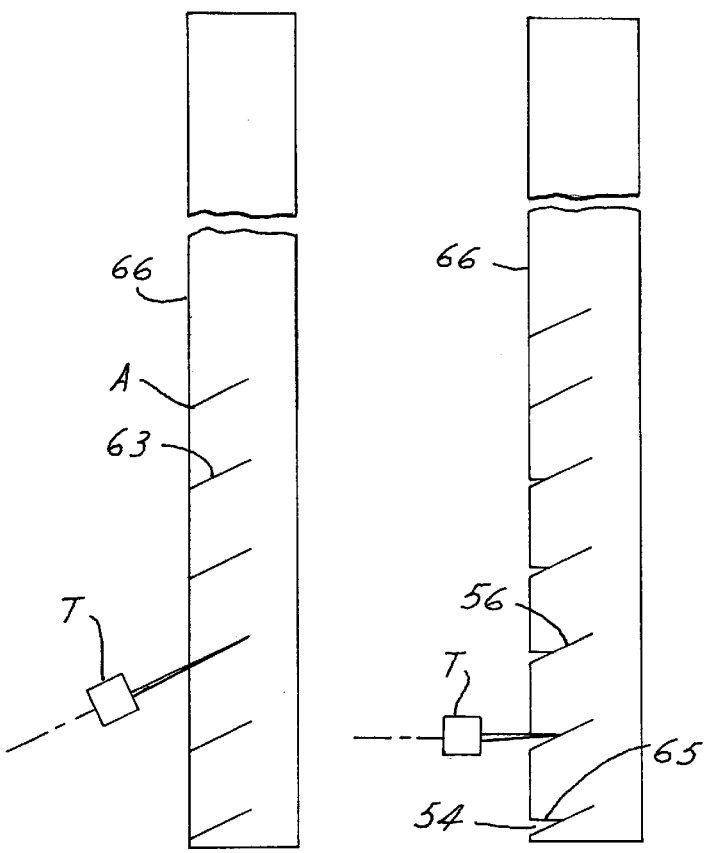

HYDRODYNAMIC SEAL AND METHOD OF MAKING THE SAME

This invention relates generally to hydrodynamic seals and more particularly to seals having hydrodynamic grooves formed therein.

BACKGROUND OF THE INVENTION

Hydrodynamic shaft seals are conventionally made by molding, embossing or cutting a spiral groove or other hydrodynamic structure or aid into the seal. The hydrodynamic groove interacts with a rotating shaft to pump any lubricating oil that may find its way under the seal back to the oil side of the seal.

Hydrodynamic aids may take the form of an open spiraling channel as illustrated in U.S. Pat. No. 6,168,164, assigned to the assignee of this application, and the disclosure of which is incorporated herein by reference. Open spiraling channels have a large pumping capacity due to the relatively large fluid volume capacity they provide. However, there is a practical upper limit to the size of such open channels. Making them too large in an effort to increase flexibility can impair the static sealing capabilities and/or lead to excessive hydrodynamic pumping action, both of which are detrimental to the performance of the seal. Making the channel too large may also increase the likelihood of leakage of oil under certain conditions.

SUMMARY OF THE INVENTION

In accordance with a preferred embodiment of the present invention, a spiral hydrodynamic channel is formed in the seal wherein successive turns of the channel are of progressively diminishing volume, with the larger volume regions near the oil side of the seal and the smaller volume regions near the air side. By diminishing the volume toward the air side, the static sealing properties of the seal are improved, preventing the leakage of oil under conditions when the shaft is not rotating and/or under conditions where the housing is lightly pressurized. The larger volume regions near the oil side accommodate a greater volume of oil and thus provide an enhanced dynamic pumping effect during rotation of the shaft.

The invention also includes a method of forming a hydrodynamic channel in a shaft seal by forming a spiral first cut in a surface of the seal, and forming a second cut adjacent to the first cut to produce a spiral channel, wherein the second cut has a smaller lead than the first cut so that the channel thus formed is of progressively diminishing volume along its length.

As an alternative, the spiral channel may have one or more turns of a relatively large volume near the oil side, and a turn or turns or even a partial turn of smaller volume near the air side. In the method of forming this alternative construction, the second cut may, after one or more turns of a relatively large volume channel are formed, be adjusted to a smaller lead such that the channel becomes smaller in volume.

It is an object of the present invention to provide a hydrodynamic seal and method of manufacture having the foregoing features and capabilities.

Other objects, features and advantages of the invention will become more apparent as the following description proceeds, especially when considered with the accompanying drawings.

BRIEF DESCRIPTION OF THE DRAWINGS

FIG. 4 is a fragmentary cross-sectional view of a seal assembly embodying the present invention shown assembled between a rotating shaft and a stationary bore of a housing;

FIG. 5 is an enlarged cross-sectional view of a portion of the sealing lip within the oval 5 in FIG. 4 in the installed condition;

FIGS. 6 and 7 illustrate a preferred method of forming the hydrodynamic features according to the invention.

DETAILED DESCRIPTION OF THE PREFERRED EMBODIMENTS

Figure 1:
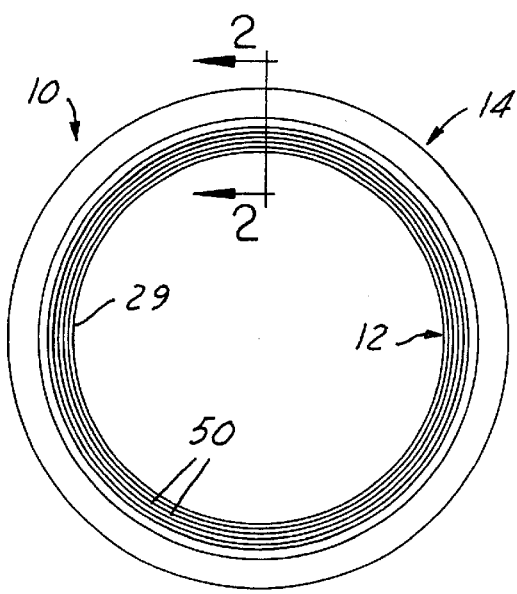
FIG. 1 is an end view of a radial-type shaft seal prepared according to the invention.

Referring initially to FIGS. 1–5, a hydrodynamic shaft seal assembly constructed according to a presently preferred embodiment of the invention is shown generally at 10 and comprises a seal 12 mounted in a carrier 14 for installation within a bore 16 of a housing 18 for sealingly engaging a relatively rotatable shaft 20 in such manner as to contain a fluid, typically lubricating oil, on an oil side 22 of the seal assembly 10 and to exclude contaminants on an axially opposite, air side 24 of the assembly.

The seal 12 is in the form of an annular plate or wafer made of a polymeric material, and preferably a polytetrafluroethylene (PTFE) compound, which is cut from a tubular billet. Fillers may be added to the wafer material to specifically adapt the wafer for its intended use. Suitable filler materials include glass fibers, molybdenum disulfide, graphite and bronze. The seal 12 includes an annular radial, outer portion 26 fixed to the carrier 14 and an annular flexible radial, inner portion 28 extending radially inwardly of the carrier 14 and terminating in a sealing lip 29 for sealingly engaging the shaft 20. It will be understood that the term "shaft" as used herein includes a rotatable shaft per se as well as a wear sleeve equivalent mountable and rotatable with the shaft in well known manner to provide a sealing surface which may or may not be unitized with the seal assembly 10.

Figure 2:
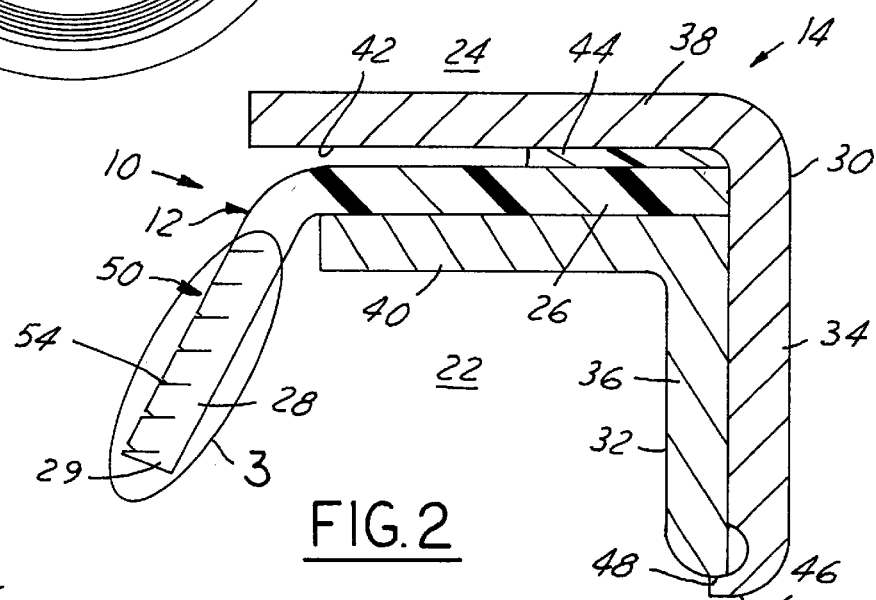
FIG. 2 is an enlarged sectional view taken along the line 2—2 in FIG. 1.

As shown best in FIGS. 2 and 4, the carrier 14 includes a metallic outer case 30 and a metallic inner case 32 having nested cylindrical body portions 34, 36 terminating at one end in axially spaced annular end flanges 38, 40 extending radially inwardly of the respective body portions 34, 36 and defining an annular gap 42 therebetween in which the radial outer portion 26 of the seal 12 is disposed. An elastomeric gasket 44 is disposed within the gap 42 between the end flange 38 of the outer case 30 and the radial, outer portion 26 of the seal 12. The end flange 40 of the inner case 32 is forced toward the end flange 38 of the outer case 30 so that the radial outer portion 26 and the gasket 44 are compressed tightly between the end flanges 38, 40 to fix the seal 12 securely in the carrier 14 and to prevent leakage of oil past the gasket 44. An end portion 46 of the outer case 30 is curled over a free edge 48 of the inner case 32, serving to lock the case members 30, 32 securely in the compressed condition.

Those skilled in the art will recognize the above described clamping arrangement for securing a seal, and particularly one fabricated of polytetrafluoroethylene (PTFE), as being well known. The invention contemplates other carrier constructions and ways of securing the seal 12 to the carrier 14 such as, for example, bonding rather than clamping the seal 12 to a carrier 14 which is likewise a known practice in the art as disclosed, for example, in U.S. Pat. No. 5,024,364 commonly owned by the assignee of the present invention and the disclosure of which is incorporated herein by reference.

According to the invention, the radial, inner portion 28 of the seal 12 is formed with hydrodynamic features generally indicated at 50 which operate during relative rotation of the shaft 20 to generate a hydrodynamic pumping action which acts to return any oil which may travel along the shaft 20 to the seal back toward the oil side 22 of the seal assembly 10 in the direction of arrow 52. In this way, any oil that finds its way between the shaft 20 and sealing lip 29 will be returned to the oil side 22 of the seal assembly 10 by action of the hydrodynamic features 50.

Figure 3:
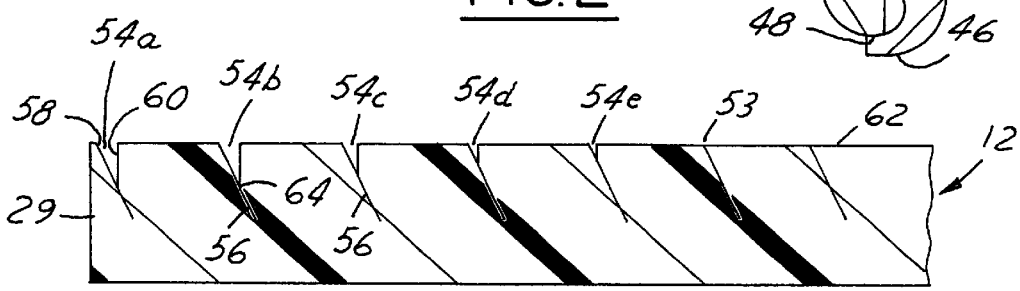
FIG. 3 is an enlarged fragmentary view of the sealing lip portion of the shaft seal within the oval 3 in FIG. 2, showing details of the hydrodynamic feature according to a preferred embodiment of the invention.

The hydrodynamic features 50 comprise a groove 53 having a spiraling open channel 54 preferably in combination with at least one flex-enhancing spiraling cut portion 56 that extends from the open channel 54 into the seal 12 to lend greater flexibility to the seal 12. FIGS. 2 and 3, show the seal 12 in a relaxed or stress-free state prior to installation on the shaft 20.

In accordance with this invention, the spiral channel 54 is of progressively decreasing volume along its length toward the air side 24, with the larger volume regions near the oil side and the smaller volume regions near the air side. The sealing properties of the seal are thus improved both when the shaft is rotating and when it is not rotating. The larger regions accommodate a greater volume of oil to increase the pumping effect toward the oil side, while the smaller volume regions adjacent to the air side are more effective in preventing leakage. As best seen in FIGS. 3 and 5, the turns of the spiral channel 54 are of progressively smaller volume toward the air side and in FIG. 3 are designated 54a, 54b, 54c, 54d and 54e. The turns of the spiral channel, or portions thereof, are sometimes referred to as channel sections.

It will be seen that the open channel 54 has walls 58, 60 that are spaced from one another at a sealing surface 62 of the seal 12 and converge or meet inwardly at a root or base 64 of the open channel 50 below the surface 62. The open channel 54 is preferably generally V-shaped in transverse section, with the walls 58 and 60 inclined to one another at a predetermined acute angle and preferably in a range of about 25° to 45°. The open channel 54 is devoid of seal material, as its walls are spaced.

FIGS. 6 and 7 illustrate a presently preferred method of forming hydrodynamic aids 50 according to the invention to include the open channel 54 and flex-enhancing cut portion 56. The basic process of forming a PTFE seal from a tubular billet is disclosed in U.S. Pat. No. 3,857,156, the disclosure of which is incorporated herein by reference. A tubular billet is mounted in a chuck and rotated about its axis with an outer face 66 thereof exposed. A pair of spiraling cross cuts are machined by a tool T into the face 66 of the seal 12 to provide the resultant open channel 54 and flex-enhancing cut portion 56. The spiral cuts intersect in such manner as to remove material to provide the open channel 54 while retaining at least one cut extending beyond the channel defining the closed flex-enhancing cut portion 56.

A first spiral cut is shown in FIG. 6 at 63. A second spiral cut 65 (FIG. 7) is angularly offset with respect to the first cut and extends from a location on the face 66 that is radially spaced from the location of the first cut 63 into the seal in converging relation to the first cut. The intersecting cut detaches the material necessary to form the open channel 54 and leaves a portion intact from the location of the intersection with the first cut leaving the flex-enhancing cut portion 56. As illustrated in FIG. 7, two flex-enhancing cut portions may result.

In order to make the spiral channel of progressively diminishing volume along it length toward the air side 24, and thus of progressively increasing volume toward the oil side 22, the first spiral cut 63 is made with a pre-selected lead, so that each turn of the first cut is spaced from adjacent turns of the cut by a predetermined distance. The second spiral cut 65 is made with a different lead, which may be a) slightly smaller than the lead of the first cut, so that each turn of the second cut is spaced from adjacent turns of the second cut by a slightly smaller distance than the distance between the turns of the first cut in which event the spiral channel 54, and hence the channel sections 54a–54e, will be of progressively diminishing volume, or b) slightly greater than the lead of the first cut, so that each turn of the second cut is spaced from adjacent turns of the second cut by a slightly larger distance than the distance between the turns of the first cut in which event the spiral channel, and hence the channel sections, will be of progressively increasing volume.

When the seal 10 is installed, as shown in FIG. 4, there is shaft interference which flexes the radial, inner portion 28 axially, causing the lip 29 of the seal 12 to lie down against the shaft 20 providing a collar-like seal about the shaft 20. As illustrated best in FIGS. 4 and 5, the cut portions 56 open up slightly as the seal is flexed onto the shaft, which has the effect of reducing the radial sealing force that the seal 12 exerts about the shaft 12 when installed, as compared to a seal without the added cut portion 56. The reduced load beneficially decreases wear on the seal 12 due to frictional contact and, in doing so, prolongs the operating life of the seal.

Figure 8:
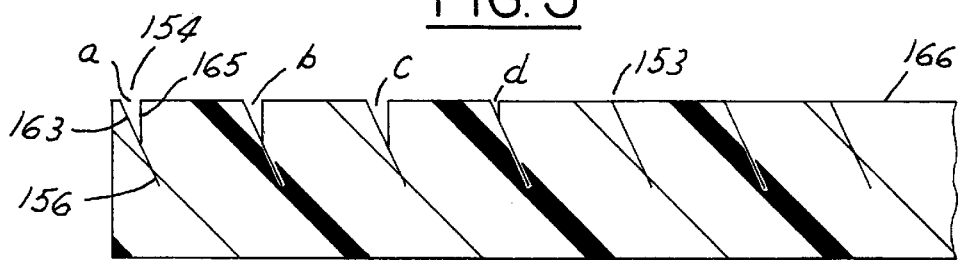
FIG. 8 is a view similar to FIG. 3, but shows a modification.

FIG. 8 shows an alternative construction in which the groove 153 has a spiraling open channel 154 preferably in combination with at least one flex-enhancing spiraling cut portion 156. The spiral channel 154 is of a constant relatively large volume for one or more turns, here shown as three turns, near the oil side. The channel in the next turn away from the oil side is shown as being of a relatively small volume. The relatively small volume portion of the channel may be only one turn, or it may be more than one turn or less than one turn. As with the embodiment shown in FIG. 3, the relatively large volume portion of the channel 154 accommodates a greater volume of oil to increase the pumping action toward the oil side, while the smaller volume portion adjacent the air side is more effective in preventing leakage. The side walls of the channel may be inclined to one another at the same acute angle as described in connection with the first embodiment.

The method of forming the channel 154 and the spiral cut portion 156 in FIG. 8 is similar to the method previously described. Accordingly the tubular billet is rotated, as in the method first described, and a pair of spiraling cross-cuts are machined as by the tool T to provide the channel 154 and flex-enhancing cut portion 156. A first spiral cut is shown in FIG. 8 at 163. A second spiral cut 165 is offset angularly with respect to the first cut and extends from the surface 166 of the seal at a point that is spaced from the first cut but in converging relation to the first cut to intersect the first cut below the surface and form the open channel 154.

The first cut 163 is made with a pre-selected lead so that each turn of the first cut is spaced from adjacent turns thereof by a predetermined distance. The second spiral cut 165 is initially made with the same lead as the first cut so that the first one or more channel turns, in this instance the three designated a, b and c, near the oil side will be of the same or a constant volume. Thereafter the lead of the second cut is made smaller than the lead of the first cut so that the channel portion d will be of smaller volume. The smaller lead cut may be taken for one turn, or more than one turn, or less than one turn so that near the air side the volume of the channel is reduced and accordingly more effective in preventing leakage.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A hydrodynamic shaft seal assembly comprising:
    a carrier;
    a seal mounted on said carrier having a sealing surface for sealingly engaging a relatively rotatable shaft; and
    hydrodynamic features provided in said seal comprising a plurality of open channel sections disposed in a spaced apart series along a longtiudinal axis of said seal, at least one of the channel sections being of substantially the same shape and of a different volume than the other of said channel sections when in a relaxed state prior to installation about and including planar opposing walls converging at a root of each channel section and a flex-enhancing cut portion extending from said root of at least some of said open channel section into the seal to increase flexability thereof.

2. The shaft seal assembly of claim 1, wherein said at least one of said channel sections is of smaller volume than the other of said channel sections and is located adjacent an air side of said seal.

3. The shaft seal assembly of claim 1, wherein a first series of said channel sections adjacent an oil side of the seal are of a constant volume, and another series of said channel sections adjacent said air side are of a volume smaller than said constant volume of said first series.

4. The shaft assembly of claim 1, wherein said channel sections extend in a spiral configuration and in a progressively decreasing volume.

5. The shaft seal assembly of claim 4, wherein each of said channel sections is devoid of seal material at said sealing surface and is provided by opposed walls spaced apart at said sealing surface and converging at a location below said sealing surface when the seal is in a relaxed condition.

6. A hydrodynamic shaft seal assembly comprising:
    a carrier;
    a seal mounted on said carrier having a sealing surface for sealingly engaging a relatively rotatable shaft; and
    hydrodynamic features provided in seal comprising a plurality of channel sections of substantially the same shape and disposed in a spaced apart series of progressively changing volume along a longitudinal axis of said seal.

7. The seal assembly of claim 6, wherein the channel sections extend in a spiral configuration.

8. The shaft seal assembly of claim 6, wherein said channel sections are of progressively diminishing volume toward an air side of the seal.

9. The shaft seal assembly of claim 8, wherein each of said channel sections is devoid of seal material at said sealing surface and is provided by opposed walls spaced apart at said sealing surface and converging at a location below said sealing surface when the seal is in a relaxed condition.

10. The shaft seal assembly of claim 9, wherein said opposed walls of each of said channel sections are angularly related to one another and converge at a root of each of said channel sections.

11. The shaft seal assembly of claim 10, wherein the opposed walls of each of said channel sections are set an angle to one another in a range of about 25°–45°.

12. The shaft seal assembly of claim 11, further including a flex-enhancing cut portion extending from the root of each of said channel sections into the seal to increase the flexibility thereof.

13. The shaft seal assembly of claim 12, wherein said channel sections extend in a spiral configuration.

14. A method of forming a spiraling hydrodynamic channel in a shaft seal comprising:
    forming a spirally extending first cut in a surface of the seal along a first path;
    forming a spirally extending second cut in the surface of the seal along a second path adjacent to the first path such that the first and second cuts are of substantially the same shape and intersect below the surface of the seal to produce a spiral channel in the surface; and
    wherein the spiral of the first cut has a first lead and the spiral of the second cut has a second lead which is the same as the first lead for the first one or more turns of the second cut, whereby a first portion of the channel formed in said first one or more turns of the second cut is of constant volume, after which the lead of the second cut is reduced to provide a second portion of the channel which is of smaller volume than the first portion of the channel.

15. A method of forming a spiraling hydrodynamic channel in a shaft seal comprising:
    forming a spirally extending first cut in a surface of the seal along a first path;
    forming a spirally extending second cut in the surface of the seal along a second path adjacent to the first path such that the first and second cuts are of substantially the same shape and intersect below the surface of the seal to produce a spiral channel in the surface; and
    wherein the spiral of the first cut has a first lead and the spiral of the second cut has a second lead different from the first lead such that the channel is of progressively changing volume along its length.

16. The method of claim 15, wherein the channel is of progressively diminishing volume toward an air side of the seal.

* * * * *